United States Patent Office 2,888,496  
Patented May 26, 1959

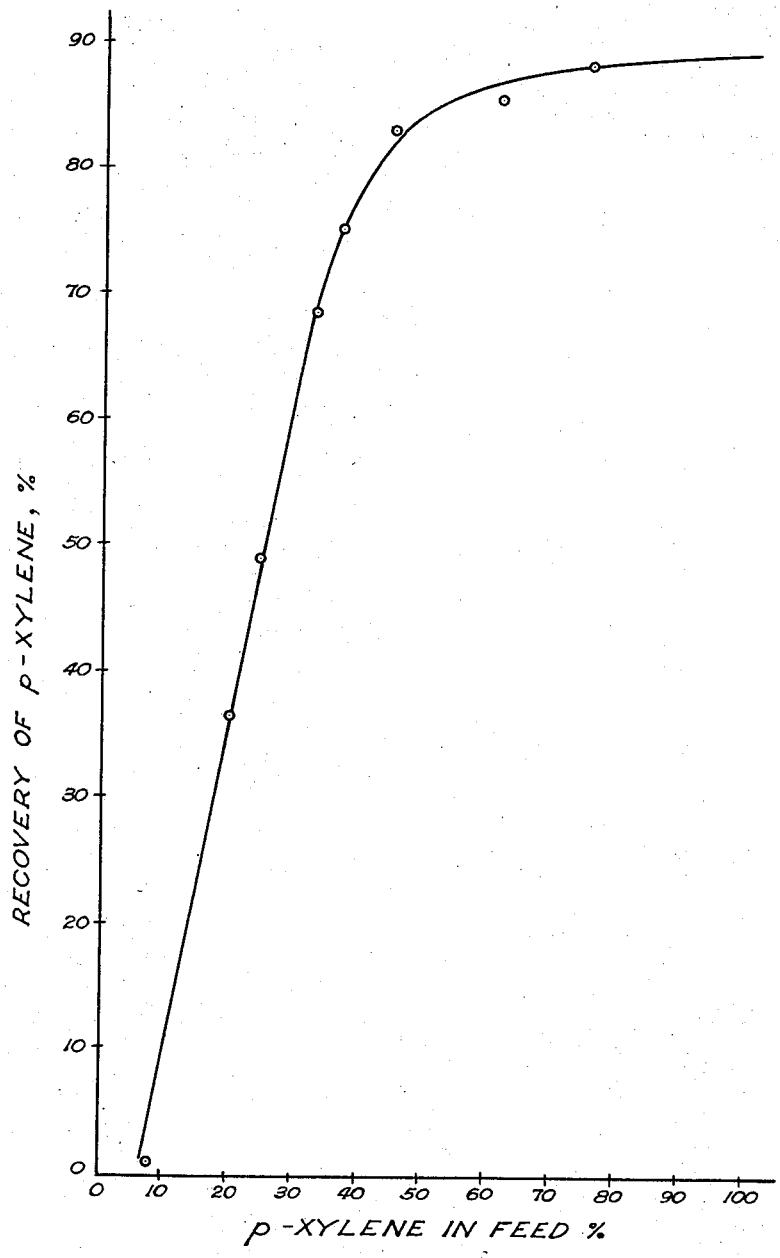

2,888,496

AROMATIC HYDROCARBON ISOMER SEPARATION WITH AN ANTIMONY TRIHALIDE

Carleton B. Scott, Pomona, Calif., assignor to Union Oil Company of California, Los Angeles, Calif., a corporation of California Application May 18, 1953, Serial No. 355,532

9 Claims. (Cl. 260—674)

This invention relates to the separation of aromatic hydrocarbons, and in particular concerns an improved method for treating mixtures of aromatic hydrocarbon isomers to separate therefrom a fraction enriched in one particular isomer.

Certain aromatic hydrocarbon compounds, particularly the dialkylbenzenes, are ordinarily obtained in the form of isomeric mixtures from which the individual isomers cannot be separated by conventional fractional distillation processes. For example, the $C_8$ fraction of the product obtained in petroleum hydrocarbon reforming operations contains ortho-, meta- and para-xylenes and ethylbenzene, all of which have boiling points within about 8° C. of each other. Two of the isomers, meta- and para-xylene, boil within about 0.5° C. of each other. Various methods have been proposed for resolving isomeric mixtures, e.g., crystallization at low temperatures, extractive distillation, selective chemical reaction, etc. Among such methods, that described in the copending application of Schaeffer, Scott and Dorsey, Serial No. 352,582 filed May 1, 1953, now abandoned, is particularly attractive by reason of its excellent selectivity. Such method comprises dissolving an antimony halide, such as antimony trichloride or antimony tribromide, in the isomeric hydrocarbon mixture to form a single liquid phase. Usually it is necessary to heat the mixture to about 40°–90° C. to attain complete solution of the antimony halide. The solution is then cooled, usually to about 10°–40° C., whereupon a crystalline solid precipitates from the solution. Such solid is filtered off, and is then distilled to recover therefrom a hydrocarbon fraction in which the ratio of isomers is substantially different from the ratio thereof in the original mixture. The filtrate is also usually distilled to recover therefrom a hydrocarbon fraction. The term "raffinate" is herein employed to refer to the hydrocarbon product recovered from the solid phase, and the term "extract" is employed to refer to the hydrocarbon product recovered from the filtrate. The excellent selectivity of this process is indicated by the fact that when it is applied to a $C_8$ hydrocarbon mixture such as is obtained by extracting a typical petroleum hydrocarbon reformate with a glycol and comprising only about 20 percent of para-xylene, about 45 percent of meta-xylene, about 20 percent of ortho-xylene and 15 percent of ethylbenzene, the raffinate contains about 77 percent of para-xylene and about 23 percent of the other components of the original mixture. In other words, the ratio of para-xylene to the other components is raised from about 0.25/1 to about 2.65/1 in a single operation.

I have now found that the foregoing process may be greatly improved with respect to the amount of the selectively separated compound which is recovered in the raffinate by initially increasing the proportion in which such compound is present in the feed mixture. More particularly, I have found that in the above-described process the recovery factor, i.e., the ratio $$\frac{\text{Amount of separated component present in raffinate}}{\text{Total amount of separated component present in feed mixture}} \times 100 = \text{percent recovery}$$

varies directly but non-uniformly with the concentration of such compound in the feed mixture. Thus, as the process is applied to the treatment of a xylene mixture I have found that of the total amount of the para isomer in the feed mixture the proportion which appears in the raffinate varies with the concentration of the para isomer in the original xylene mixture. Accordingly, the efficiency of the process may be greatly improved, and the maximum amount of para isomer obtained in the raffinate, if the concentration of the para isomer in the feed mixture is increased by admixing therewith a portion of the raffinate obtained from a previous operation.

The manner in which the recovery of the selectively separated compound varies with the concentration of that compound in the feed mixture is shown by the following data obtained by dissolving antimony trichloride in a number of mixtures comprising para-xylene in varying concentration. In each case, the feed mixture was warmed to about 60°–70° C. to obtain complete solution of the antimony trichloride. Each solution was then cooled to about 20°–25° C., and the solid which was thereby precipitated was filtered off and steam-distilled. The distillates were analyzed for para-xylene, and the recovery factor, i.e., the proportion of the total amount of para-xylene present which was recovered in the distillate, was determined in each case.

| Run No. | Composition of Feed Mixture, Percent by Vol. | | | | Recovery of para-, Percent |
|---|---|---|---|---|---|
| | p-Xylene | m-Xylene | o-Xylene | Ethyl-benzene | |
| 1 | 9.0 | 54.6 | 18.2 | 18.2 | 1.1 |
| 2 | 20.0 | 45.0 | 20.0 | 15.0 | 36.5 |
| 3 | 24.5 | 45.4 | 15.1 | 15.1 | 49.0 |
| 4 | 32.7 | 40.3 | 13.5 | 13.5 | 68.6 |
| 5 | 37.5 | 37.5 | 12.5 | 12.5 | 75.0 |
| 6 | 44.4 | 33.3 | 11.1 | 11.1 | 83.0 |
| 7 | 61.0 | 16.0 | 8.0 | 15.0 | 85.8 |
| 8 | 75.0 | 7.0 | 3.0 | 15.0 | 88.6 |

These data are presented graphically in single figure of the drawing which forms a part of this specification. It will readily be apparent that the optimum recovery of the selectively separated compound is attained only when the concentration of that compound in the feed mixture is above about 40 percent, preferably above about 50 percent.

The present invention thus consists in the improvement in the above-described process for separating aromatic hydrocarbons which comprises adding to the feed mixture, prior to the treatment thereof with the antimony halide, sufficient of the selectively separated component to raise the concentration of that component in the feed mixture to a value above about 40 percent, preferably above about 50 percent. Usually, the process of the invention will be carried out continuously with continuous recycling of sufficient raffinate to raise the concentration of the selectively separated component in the feed mixture to the desired value. It will be apparent, of course, that the concentration of the selectively separated component in the initial feed mixture must not be so low that in order to raise the concentration of that component to a value above about 40 percent there must be employed more raffinate than is produced in the process. Such lower limit on the concentration of the selectively separated component can readily be calculated from data such as those presented in the foregoing table and in Figure 1. For example, if the initial composition contains 20 parts of para-xylene and 80 parts of other xylene isomers and inerts, the amount of para-xylene which must be added to such composition to raise the para-xylene concentration to 44.4 percent can be calculated to be 43.9 parts. The total amount of para-xylene present will thus be 63.9 parts. From Figure 1 it is determined that the recovery of para-xylene from a composition containing 44.4 percent of the same is 83.0 percent. Accordingly, of the 63.9 parts of para-xylene present in the enriched composition, 58.0 parts (63.9×0.83) are present in the raffinate. The net production of para-xylene is thus 14.1 parts (58.0—43.9) as compared to the 7.3 parts (20×0.365) obtained when the 20 percent stream is employed without enrichment.

The initial step of the process consists in forming an enriched feed mixture by increasing the concentration of the selectively separated compound in the original feed stream by adding thereto a recycle stream which contains said compound in a concentration higher than that of the original feed stream. As previously stated and as shown by the drawing, the concentration of said compound in the original feed stream should be increased to above about 40, preferably above about 50, percent by volume in forming the enriched feed mixture. Thus, if the original feed mixture comprises about 20 percent by volume of para-xylene and about 80 percent by volume of ortho- and meta-xylenes and ethylbenzene, it will initially be mixed with sufficient raffinate from a previous run, which will typically contain about 77 percent by volume of para-xylene with a recovery factor of about 36.5 percent, to raise the concentration of para-xylene to, say, about 45 percent by volume, in which case the raffinate obtained will typically contain about 86 percent by volume of para-xylene with a recovery factor of about 83 percent.

A simple calculation shows that in order to increase the concentration of para-xylene in the original feed mixture from about 20 percent by volume to form an enriched feed mixture containing about 45 percent by volume, about 75 volumes of the raffinate containing about 77 percent by volume of para-xylene must be added to each 100 volumes of the feed mixture. Similarly, if the feed mixture comprises only ortho- and meta-xylenes and ethylbenzene, since the antimony halide treatment selectively separates the xylenes the original feed mixture will be admixed with sufficient raffinate to increase the concentration of the xylenes to the desired value above about 20 percent by volume.

After enrichment of the original feed stream with respect to the selectively separated compound, the enriched feed mixture is then admixed with an antimony halide, preferably antimony trichloride or antimony tribromide, at a temperature such that a single liquid phase is formed. Such temperature is usually between about 40° C. and about 90° C., and in the interests of heat economy is maintained as low as possible. Furthermore, heating of the mixture of hydrocarbon and antimony halide to excessively high temperatures, e.g., above about 150° C., may give rise to undesirable isomerization.

The amount in which the antimony halide is employed depends somewhat upon the composition of the hydrocarbon mixture being treated, i.e., upon the proportion of the component which the antimony halide selectively separates from the mixture. As is shown by the preceding examples, when the mixture comprises dialkylbenzene isomers the para isomer is the component which is separated from the other components, and accordingly the amount of antimony halide employed will depend somewhat on the proportion of the para isomer in the enriched feed mixture. In general, between about 0.5 and about 10 moles of the antimony halide is employed per mole of the compound which is selectively separated. When the enriched feed mixture consists of $C_8$ aromatics comprising between about 20 and about 75 percent of para-xylene, the antimony halide is preferably employed in an amount representing between about 0.5 and about 5 moles per mole of the mixture.

The temperature to which the liquid mixture of hydrocarbon and antimony halide must be cooled to effect separation of the solid phase depends upon a number of factors. As in substantially all crystallization operations, the material which initially crystallizes out of solution is the purest, and the maximum quantity of crystallized material is obtained only at the sacrifice of purity. Accordingly, if it is desired to operate the process so as to obtain the selectively separated component of the hydrocarbon mixture in a high state of purity but in decreased yield, the liquid mixture of antimony halide and hydrocarbon will be cooled only sufficiently to precipitate a relatively small quantity of the solid phase. On the other hand, if it is desired to effect a greater recovery at a sacrifice in purity, the mixture may be cooled to a much greater extent before separating off the precipitated solid phase. It will be realized, of course, that these considerations are independent of the fact that at any given temperature the recovery factor will vary with the concentration of the selectively separated compound in the manner previously described and illustrated by the drawing.

Separation of the crystalline solid phase from the liquid may be carried out in any of the conventional ways, e.g., by filtration, centrifuging, or in some cases by settling and decantation. The crystals are of relatively large size and settle rapidly, and relatively no difficulty is encountered in separating them from the liquid by simple filtration.

The crystalline solid decomposes at relatively low temperatures, e.g. 40°–125° C., and the hydrocarbon may accordingly be separated from its association with the antimony halide in the separated solid phase by simple distillation, either at atmospheric or reduced pressures. In most instances the boiling point of the antimony halide will be above that of the hydrocarbons associated therewith in the crystalline solid, in which case the hydrocarbons are taken off as the overhead product leaving the antimony halide as distillation bottoms. Should the converse condition prevail, the antimony halide will distill overhead leaving the hydrocarbon as a bottoms product. When antimony trichloride is employed to separate para-xylene from mixed xylenes, the distillation is carried out at a temperature between about 135°–145° C. and under atmospheric pressure, or if desired it may be effected at considerably lower temperatures under reduced pressure. The hydrocarbon may also be recovered from its association with the antimony halide in the crystalline solid by selective solvent extraction, preferably at a temperature above about 50° C. The hydrocarbon and antimony halide which comprise the filtrate from which the crystalline solid has been separated may likewise be separated by distillation under atmospheric or reduced pressure or by selective solvent extraction.

Regardless of the manner in which the crystalline solid and the filtrate are treated for the recovery of the hydrocarbon contained therein, four product streams are obtained: (1) the raffinate comprising the selectively separated hydrocarbon in relatively high concentration, (2) antimony halide recovered from the solid, (3) the hydrocarbon extract comprising the selectively separated hydrocarbon in relatively low concentration, and (4) antimony halide recovered from the filtrate. As previously described, sufficient of the raffinate stream is recycled to the initial step of the process wherein the original feed mixture is enriched so as to contain the selectively separated component in at least about 40 percent concentration.

The remainder of the raffinate is passed to storage or is again treated with the antimony halide as is hereinafter described. The two antimony halide products are combined and recycled back to the admixing step. The extract is passed to storage or is further treated as hereinafter described.

As will be apparent to those skilled in the art, the process of the invention may be carried out batch-wise or continuously with periodic or continuous recycling of the antimony halide from the final recovery step back to the admixing step. Like other separation processes the present process may be carried out in a plurality of stages arranged in cascade fashion with the initial raffinate and extract being subjected to further treatment with an antimony halide as herein described. Also, the process may be applied in combination with other separation processes, e.g., freezing, treatment with a mixture of hydrogen and boron fluorides, etc., so as to effect the recovery of two or more components of the original mixture in substantially pure form. It may also be combined with isomerization processes whereby undesired isomeric components of the feed mixture are isomerized to extinction to produce a substantially pure isomer as substantially the sole product. Thus, an extract from the present process comprising meta- and ortho-xylenes may be treated with a mixture of hydrogen and boron fluorides at an elevated temperature to obtain an isomerized product comprising para-xylene. Such product may be treated with an antimony halide as herein explained, and by repeating this sequence of operations a number of times the ortho and meta isomers are isomerized to extinction so that only substantially pure para-xylene is substantially the product produced from the original mixture.

While the process has herein been described as applied to the separation of isomeric xylenes and C₈ reformates, the invention is not thereby limited but is applicable generally to the separation of aromatic compounds of the benzene series, particularly dialkylbenzenes in which each alkyl group contains from 1 to 4 carbon atoms, e.g., diethylbenzenes, cymenes, diisobutylbenzenes, ethyltoluenes, dipropylbenzenes, etc.

Other modes of applying the principle of my invention may be employed instead of those explained, change being made as regards the materials or methods employed provided the step or steps stated by any of the following claims, or the equivalent of such stated step or steps, be employed.

I, therefore, particularly point out and distinctly claim as my invention:

1. In a process for treating a hydrocarbon mixture comprising isomeric dialkylbenzenes in which each alkyl group contains from 1 to 4 carbon atoms and containing the para isomer in a concentration less than about 40 percent by volume, wherein said mixture is admixed with an antimony halide selected from the class consisting of antimony trichloride and antimony tribromide to form a single liquid phase, said liquid is cooled to a temperature at which there is precipitated a solid phase comprising said antimony halide and said dialkylbenzenes, the ratio of isomers in said solid phase being substantially different from the ratio thereof in the original mixture, said solid phase is separated from said liquid phase, and the solid phase so separated is treated to recover therefrom a dialkylbenzene raffinate containing the para isomer in a concentration substantially greater than about 40 percent by volume, the improvement which consists in initially admixing with said original mixture sufficient of said raffinate to raise the concentration of the para isomer to a value above about 40 percent by volume, said original mixture containing the para-isomer at least in such amount that the quantity of para-isomer contained in said raffinate required to raise the concentration of para-isomer in said original mixture to said value greater than about 40 percent by volume is substantially less than the quantity of para-isomer contained in the total amount of raffinate produced.

2. The process of claim 1 wherein the hydrocarbon mixture comprises isomeric xylenes.

3. The process of claim 1 wherein the hydrocarbon mixture is the C₈ fraction of a petroleum hydrocarbon reformate comprising isomeric xylenes and ethylbenzene.

4. The process for separating a para-dialkylbenzene in which each alkyl group contains from 1 to 4 carbon atoms from a mixture comprising said para-dialkylbenzene in a concentration less than about 40 percent by volume and isomeric dialkylbenzenes, which comprises adding to said mixture a recycle stream containing said para-dialkylbenzene in a concentration substantially greater than about 40 percent by volume in an amount sufficient to raise the concentration of said para-dialkylbenzene in said mixture to a value above about 40 percent by volume; admixing the mixture so enriched in said para-dialkylbenzene with between about 0.5 and about 5 molecular equivalents of an antimony halide selected from the class consisting of antimony trichloride and antimony tribromide to form a single liquid phase; cooling said liquid phase to a temperature at which there is precipitated a solid phase comprising said antimony halide and said dialkylbenzenes, the ratio of said para-dialkylbenzene to said isomeric dialkylbenzenes in said solid phase being substantially higher than the ratio thereof in said enriched mixture; separating said solid phase from said liquid phase; treating the separated solid phase to recover therefrom a raffinate comprising isomeric dialkylbenzenes and containing said para-dialkylbenzene in a concentration substantially greater than about 40 percent by volume; and returning a portion of said raffinate to the initial step of the process as said recycle stream, the concentration of para-dialkylbenzene in the original mixture being sufficiently high that the quantity of said recycle stream required to raise the concentration of para-dialkylbenzene to said value greater than about 40 percent by volume is substantially less than the total amount of said raffinate produced.

5. The process of claim 4 wherein the dialkylbenzenes are xylenes.

6. The process for separating a para-dialkylbenzene in which each alkyl group contains from 1 to 4 carbon atoms from a mixture comprising said para-dialkylbenzene in a concentration less than about 50 percent by volume and isomeric dialkylbenzenes, which comprises adding to said mixture a recycle stream containing said para-dialkylbenzene in a concentration substantially greater than about 50 percent by volume in an amount sufficient to raise the concentration of said para-dialkylbenzene in said mixture to a value above about 50 percent by volume; admixing the mixture so enriched in said para-dialkylbenzene with between about 0.5 and about 5 molecular equivalents of an antimony halide selected from the class consisting of antimony trichloride and antimony tribromide to form a single liquid phase; cooling said liquid phase to a temperature at which there is precipitated a solid phase comprising said antimony halide and said dialkylbenzenes, the ratio of said para-dialkylbenzene to said isomeric dialkylbenzenes in said solid phase being substantially higher than the ratio thereof in said enriched mixture; separating said solid phase from said liquid phase; treating the separated solid phase to recover therefrom a raffinate comprising isomeric dialkylbenzenes and containing said para-dialkylbenzene in a concentration substantially greater than about 50 percent by volume; and returning a portion of said raffinate to the initial step of the process as said recycle stream, the concentration of para-dialkylbenzene in the original mixture being sufficiently high that the quantity of said recycle stream required to raise the concentration of para-dialkylbenzene to said value greater than about 50 percent by volume is substantially less than the total amount of said raffinate produced.

7. The process for separating para-xylene from a mixture comprising isomeric xylenes and containing para-xylene in a concentration less than about 40 percent by volume which comprises adding to said mixture a recycle stream comprising xylene isomers and containing para-xylene in a concentration substantially greater than about 40 percent by volume in an amount sufficient to raise the concentration of para-xylene in said mixture to a value substantially above about 40 percent by volume; admixing the mixture so enriched in para-xylene with between about 0.5 and about 5 moles of antimony trichloride per mole of xylenes to form a single liquid phase; cooling said liquid phase to a temperature between about 10° C. and about 40° C. to effect the precipitation of a solid phase comprising antimony trichloride and isomeric xylenes, the ratio of para-xylene to said isomeric xylenes in said solid phase being substantially higher than the ratio thereof in said enriched mixture; separating said solid phase from said liquid phase; fractionally distilling the separated solid phase under reduced pressure to obtain a bottoms fraction containing antimony trichloride and an overhead fraction comprising isomeric xylenes and containing para-xylene in a concentration substantially greater than 40 percent by volume; returning a portion of said overhead fraction to the initial step of the process as said recycle stream; and returning said bottoms fraction to said admixing step, the concentration of para-xylene in the original mixture being sufficiently high that the quantity of said recycle stream required to raise the para-xylene concentration to said value greater than about 40 percent by volume is substantially less than the total amount of said overhead fraction produced.

8. The process for separating para-xylene from a mixture comprising isomeric xylenes and containing para-xylene in a concentration less than about 50 percent by volume which comprises adding to said mixture a recycle stream comprising xylene isomers and containing para-xylene in a concentration substantially greater than about 50 percent by volume in an amount sufficient to raise the concentration of para-xylene in said mixture to a value substantially above about 50 percent by volume; admixing the mixture so enriched in para-xylene with between about 0.5 and about 5 moles of antimony trichloride per mole of xylenes to form a single liquid phase; cooling said liquid phase to a temperature between about 10° C. and about 40° C. to effect the precipitation of a solid phase comprising antimony trichloride and isomeric xylenes, the ratio of para-xylene to said isomeric xylenes in said solid phase being substantially higher than the ratio thereof in said enriched mixture; separating said solid phase from said liquid phase; fractionally distilling the separated solid phase under reduced pressure to obtain a bottoms fraction containing antimony trichloride and an overhead fraction comprising isomeric xylenes and containing para-xylene in a concentration substantially greater than about 50 percent by volume; returning a portion of said overhead fraction to the initial step of the process as said recycle stream; and returning said bottoms fraction to said admixing step, the concentration of para-xylene in the original mixture being sufficiently high that the quantity of said recycle stream required to raise the concentration of para-xylene to said value greater than about 50 percent by volume is substantially less than the total amount of said overhead fraction produced.

9. The process for separating para-xylene from a $C_8$ fraction of a petroleum hydrocarbon reformate consisting of isomeric xylenes and ethylbenzenes and containing para-xylene in a concentration less than about 40 percent by volume which comprises (1) adding to said reformate an amount of a recycle stream comprising isomeric xylenes and ethylbenzene and containing para-xylene in a concentration substantially greater than about 50 percent by volume sufficient to raise the concentration of para-xylene in said reformate to a value above about 50 percent by volume, thereby forming an enriched reformate; (2) admixing said enriched reformate with antimony trichloride including recycle antimony trichloride, the total amount of antimony trichloride being between about 0.5 and about 5 moles of antimony trichloride per mole of said enriched reformate; (3) heating the resulting mixture to a temperature between about 40° C. and about 90° C. to effect the formation of a single liquid phase; (4) cooling said liquid to a temperature between about 10° C. and about 40° C. to effect the precipitation of a solid phase comprising antimony trichloride, isomeric xylenes and ethylbenzene, the ratio of para-xylene to said isomeric xylenes and ethylbenzene in said solid phase being substantially higher than the ratio thereof in said enriched reformate; (5) separating said solid phase from said liquid phase; (6) treating the separated solid phase to recover therefrom antimony trichloride and a raffinate comprising isomeric xylenes and ethylbenzene and containing para-xylene in a concentration substantially greater than about 50 percent by volume; (7) returning a portion of said raffinate to step (1) as said recycle stream; (8) treating the filtrate obtained in step (5) to recover antimony trichloride therefrom; and (9) returning to step (2) as said recycle antimony trichloride the antimony trichloride recovered in steps (6) and (8), the concentration of para-xylene in said reformate being sufficiently high that the quantity of said recycle stream employed in step (1) is substantially less than the total amount of said raffinate obtained in step (6).

References Cited in the file of this patent

UNITED STATES PATENTS

| 2,506,289 | Beach et al. | May 2, 1950 |
| 2,521,444 | Brooke et al. | Sept. 5, 1950 |
| 2,530,978 | Mason | Nov. 21, 1950 |
| 2,652,438 | Arnold et al. | Sept. 15, 1953 |
| 2,768,220 | Nixon et al. | Oct. 23, 1956 |
| 2,768,222 | Nixon et al. | Oct. 23, 1956 |

OTHER REFERENCES

International Critical Tables, vol. IV, first ed. (1928), pages 192–193 and 196. Published by McGraw-Hill Book Company, New York, N.Y.